United States Patent [19]
Kasmer

[11] 3,857,077
[45] Dec. 24, 1974

[54] SPEED AND DIRECTION CONTROL APPARATUS FOR DC MOTORS

[75] Inventor: Thomas E. Kasmer, Endicott, N.Y.

[73] Assignee: Magnetic Laboratories, Inc., Halstead, Pa.

[22] Filed: Apr. 27, 1973

[21] Appl. No.: 355,109

[52] U.S. Cl.............. 318/257, 318/293, 318/313, 318/345
[51] Int. Cl. ............................................ H02p 5/16
[58] Field of Search .......... 318/257, 313, 331, 345, 318/291, 293

[56] References Cited
UNITED STATES PATENTS
| | | | |
|---|---|---|---|
| 3,402,338 | 9/1968 | Thoresen | 318/345 |
| 3,582,744 | 6/1971 | Coffey | 318/313 |
| 3,634,874 | 1/1972 | Mason | 318/345 |
| 3,641,409 | 2/1972 | Maeda | 318/293 |

FOREIGN PATENTS OR APPLICATIONS
1,538,071   6/1969   Germany ........................... 318/293

Primary Examiner—Robert K. Schaefer
Assistant Examiner—Thomas Langer
Attorney, Agent, or Firm—Sughrue, Rothwell, Mion, Zinn & Macpeak

[57] ABSTRACT

A speed and direction control apparatus for DC motors supplied from an AC power line. The control apparatus includes a triggerable bi-directional current conducting element selectively triggered to pass either positive or negative half cycles of the incoming AC signal to thereby control the direction of motor rotation. Triggering of the bi-directional current conducting element may be accomplished by using a photoelectric switch control circuit. In the specific embodiment of the invention the DC motor in combination with the control apparatus is adapted to operate as a servosystem.

7 Claims, 5 Drawing Figures

SPEED AND DIRECTION CONTROL APPARATUS FOR DC MOTORS

BACKGROUND OF THE INVENTION

1. Field of the Invention

The invention is in the field of DC motor control apparatus and more specifically, relates to apparatus for controlling the speed and direction of rotation of a DC motor.

2. Brief Description of the Prior Art

In DC motor control, it is general practice to supply a DC power signal to the motor armature and field windings and to control the direction of motor rotation by selectively reversing the polarity of the DC power signal supplied to the motor armature while maintaining the direction of current flow through the field winding constant. In general, the DC power supplied to the motor is derived by full wave rectifying an incoming AC signal and subsequently filtering and smoothing the full wave rectified signal. Examples of such DC motor control can be found in U.S. Pat. No. 2,254,043 to Lynn and U.S. Pat. No. 3,222,584 to DuRocher.

In recent years, workers in the field have developed speed control circuits for DC motors in which the speed control circuit supplies half wave rectified, pulsating DC signals directly to the motor armature. Speed control is effected by controlling the phase angle at which alternate half cycles are supplied to the motor armature. Phase angle control and half wave rectification is accomplished by placing a thyristor in series with the motor armature and applying the AC input signal across this series combination. Such a speed control circuit is described in U.S. Pat. No. 3,553,556 to Dosch et al. The Dosch et al. patent does not, however, provide for the control of the direction of motor rotation.

SUMMARY OF THE INVENTION

The present invention is directed to an improved DC motor control apparatus of the type which supplies half wave rectified AC power to the motor armature. The improved control apparatus of the present invention permits not only speed control, but also direction control.

Speed and direction control is accomplished in accordance with the teachings of the present invention by applying the AC input signal to the motor armature through a triggerable bi-directional current conducting device such as a Triac. Triggering of the Triac is controlled so that only selected polarity half cycles of the AC input signal are applied to the armature. The direction of motor rotation is controlled by triggering the Triac into conduction either during positive or negative half cycles of the AC power signal. Passing only positive half cycles causes the motor to rotate in one direction, while passing only negative half cycles causes the motor to rotate in a direction opposite to the direction it rotates upon receipt of positive half cycles of the AC signal.

The firing of the Triac is controlled by a switch control circuit. In a specific embodiment of the invention, the switch control circuit takes the form of a photoelectric switch control circuit, wherein a lamp-photocell combination is used to average the light response over a number of cycles of the AC power signal.

In another embodiment of the invention, the DC motor and the photoelectric switch control circuit combination is adapted to form a servosystem.

DETAILED DESCRIPTION OF THE PREFERRED EMBODIMENTS

Figure 1:
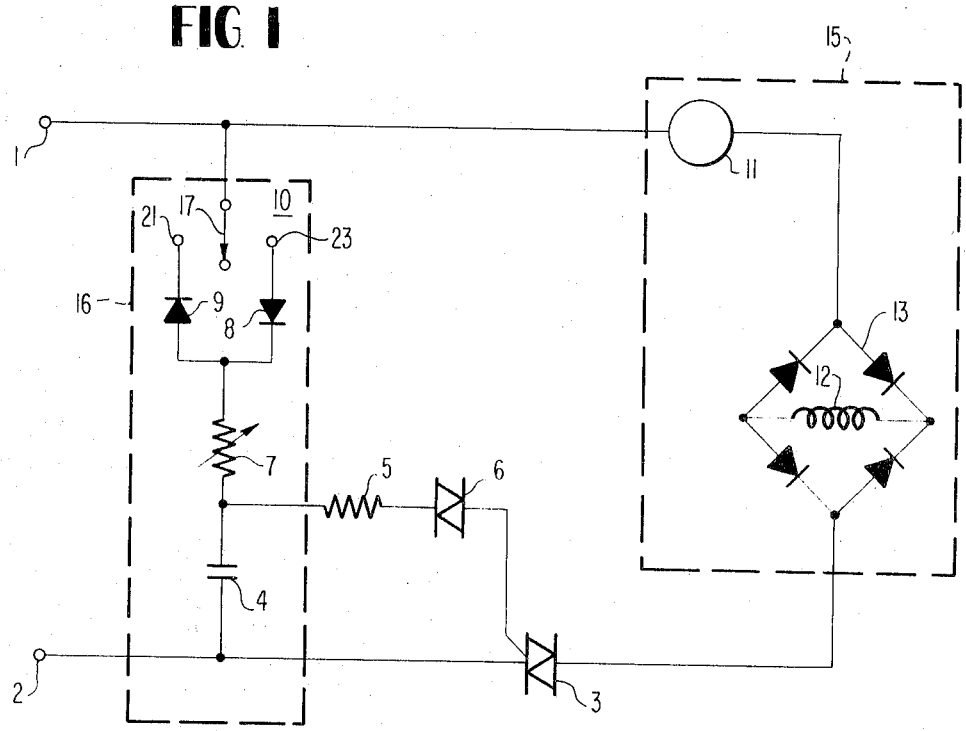
FIG. 1 is a schematic diagram of the speed and direction control circuitry illustrating the basic operation of the present invention.

Referring to FIG. 1, an input AC power signal is applied across terminals 1 and 2. For the purposes of the present description, a positive half cycle is defined herein as occuring when terminal 1 is positive with respect to terminal 2. The DC motor 15, which may be of the permanent magnet type, is shown schematically in FIG. 1 as being comprised of an armature 11 and field winding 12. Field current is applied to the field winding 12 through a bridge circuit 13, so that the current flowing in the field winding 12 is always in the same direction. A triggerable bi-directional current conducting element 3, which may take the form of a Triac, is connected in series with the armature 11 and field winding 12 and is operated to control the flow of current through the armature so that only selected alternate half cycles of the AC power signal are seen by the armature 11. Since the direction of current flow in armature 11 controls the direction of motor rotation, applying either positive or negative half cycles to armature 11 causes the motor to rotate in one direction or the other.

Selective triggering of the Triac 3 is controlled by the switch control circuit 16. This circuit is comprised of capacitor 4, variable resistance 7, diodes 8 and 9 and single throw double pole switch 10 which includes arm 17 and the terminals 21 and 23. Whether the Triac 3 will conduct during positive or negative half cycles depends upon the position of switch 10. For example, when it is desired to apply positive half cycles of the input AC signal to the armature, switch 10 is set so as to couple terminal 23 to the arm 17. In this position, during positive half cycles, current flows from terminal 1 through diode 8 and variable resistance 7 to capacitor 4. One terminal of capacitor 4 is coupled through resistor 5 to bi-directional breakdown device 6, such as a Diac. When the potential across capacitor 4 builds up to the breakdown potential of Diac 6, Diac 6 conducts to thereby trigger the Triac 3. During negative half cycles, current attempts to flow from terminal 2 through the capacitor 4, the variable resistance 7 and diode 8 to terminal 1. However, since the arm 17 of switch 10 is connected to terminal 23, diode 8 blocks current flow from terminal 2 to terminal 1 and therefore, Triac 3 cannot fire during the negative half cycles.

On the other hand, when arm 17 is connected to terminal 21, so as to complete a circuit between terminals 2 and 1 through diode 9, capacitor 4 charges to the breakdown potential of the Diac 6 during negative half cycles. During positive half cycles, capacitor 4 remains discharged and therefore Triac 3 is not fired.

Resistor 5 serves 2 functions. First, it limits the discharge current of capacitor 4 through Diac 6 to the gate of Triac 3. Second, it lengthens the gate pulse applied to Triac 3, thus overcoming one major difficulty of Triac controls in field use; namely, the Triac controls in use today will "misfire" when driving inductive type loads such as an armature. The reason for this is that being an inductive load, the current rises slowly to load value (relative to a line cycle). If the gate pulse is of short duration, and the Triac has not reached its holding current or more, it will turn off, thus "misfiring". Resistor 5 corrects this condition.

Speed control is effected by varying the variable resistor 7. Resistor 7 controls the charging rate of capacitor 4 and thus, the phase angle at which the Triac 3 fires. More specifically, when resistor 7 presents a small resistance value, capacitor 4 charges up rapidly and thus, Triac 3 fires during an early portion of the half cycle. As resistor 7 increases in value, the charging rate of capacitor 4 decreases which in turn causes the Triac 3 to fire at a later time during the half cycle.

Figure 2:
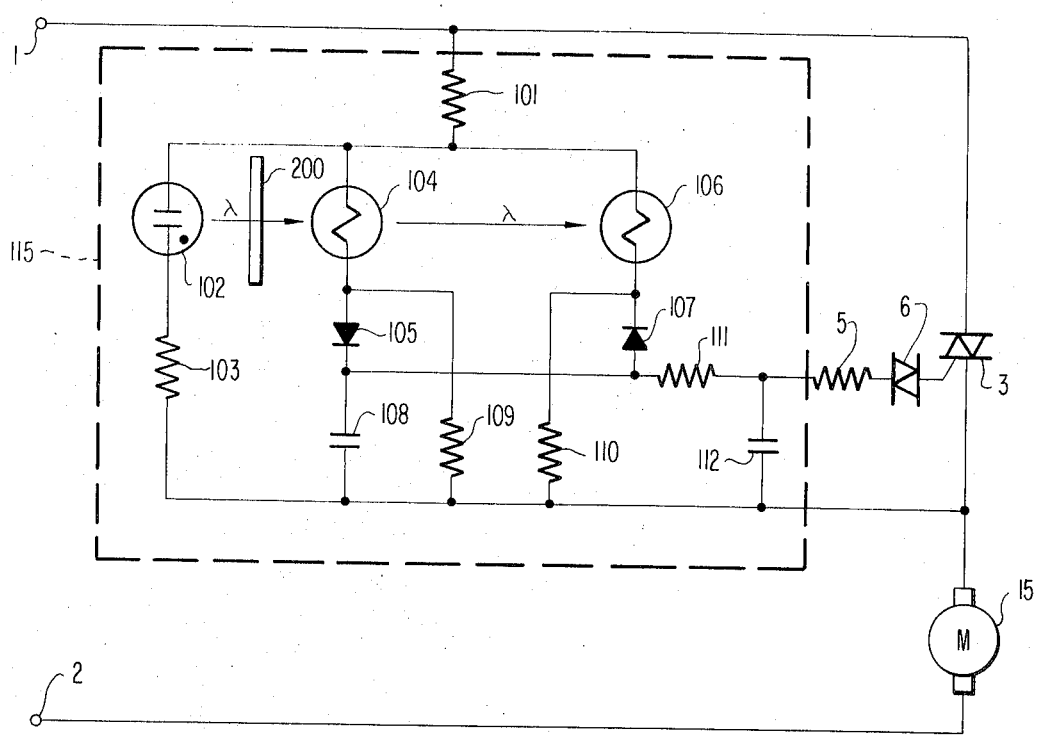
FIG. 2 is a schematic diagram of one embodiment of the control circuitry of the present invention using photoelectric speed and direction control.

Referring now to FIG. 2, wherein like elements in FIGS. 1 and 2 are referenced by the same reference numeral, the switch control circuit 16 of FIG. 1 is replaced by a photoelectric switch control circuit 115. As in FIG. 1, AC power is supplied between terminals 1 and 2. The flow of this power to the DC motor 15 is controlled by the Triac 3 which acts as a valve to control the direction and magnitude of current flow. When it allows only portions of positive half cycles of the line voltage to pass, the motor runs in what will be termed herein as the "forward direction". When only portions of the negative half cycle are allowed to pass through the motor 15 it runs in the "reverse direction". Only a portion of each half cycle is permitted to go through the motor, the widths of these portions, that is the time durations, determine the speed at which the motor will run.

Triac 3 is turned on by pulses through the Diac 6 at a time during the selected alternate half cycles determined by the photoelectric control circuit. The Triac 3 is turned off by the passage of AC voltage through zero each half cycle. Diac 6 breaks down when capacitor 112 charges to the Diac breakdown voltage.

The charging of capacitor 112 will now be described. During each selected alternate half cycle, capacitor 108 is charged through resistor 101, photocell 104 or 106, which may be photoconductors, depending upon the polarity of the selected half cycles and diode 105 or 107, depending upon which photocell is conductive and which polarity half cycle of the line voltage is selected. Current flows through photoconductor 104 and diode 105 only during positive half cycles, provided the photoconductor 104 is conductive at that time. If photoconductor 106 is conductive, negative halfcycles will charge capacitor 108 through diode 107 and photoconductor 106. The degree of conductivity of photoconductors 104 and 106 determines how long it will take to charge the capacitor 108 to the threshold voltage of the Diac 6 and therefore, the percentage of the half cycle during which the Triac 3 is conductive.

The light energization of the photocells 104 and 106 is provided by a lamp which may be a neon bulb 102, whose current is set by the supply voltage appearing across terminals 1 and 2 and resistors 101 and 103. To control the amount of light impinging on the photoconductors 104 and 106, a mask illustrated in FIG. 3 is provided.

Figure 3:
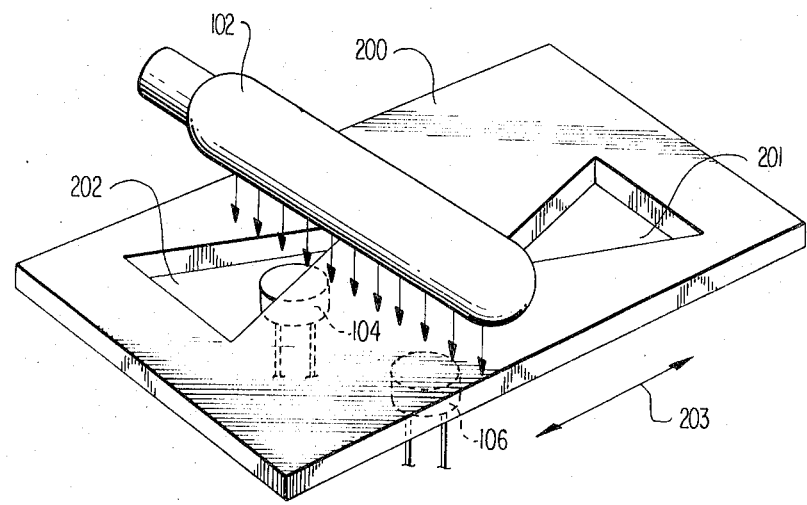
FIG. 3 illustrates the configuration of a mask functioning in conjunction with the lamp and photocells of the photoelectric control circuitry of FIG. 2 to accomplish speed and direction control.

Referring now to FIG. 3, it can be seen that the mask 200 contains shaped apertures 201 and 202. Aperture 202 permits light from lamp 102 to impinge upon photoconductor 104, while aperture 201 permits light from the lamp to impinge upon the photoconductor 106. The mask 200 is constructed so that light from the lamp 102 can impinge upon only one of the photoconductors at any point in time. Thus, in the position shown in FIG. 3, light from the lamp 102 impinges upon the photoconductor 104, while photoconductor 106 receives no light. The determination as to which photoconductor is to receive light, as well as the amount of light the selected photoconductor is to receive is controlled by moving the mask 200 in the directions shown by arrow 203. This movement can be done manually or automatically.

When the photoconductor 104 is in registration with the base area of the shaped aperture 202, a maximum amount of light is received by that photoconductor. If mask 200 is moved such that the apex of the aperture is in registration with the photoconductor 104, a minimum amount of light is received. Further movement of the mask past the apex of the aperture 202 causes no light to appear on the photoconductor 104. When lamp 102 is positioned along the midpoint of the mask 200 no light is received by either of the apertures and thus, both photoconductors are nonconducting. It should be understood, that the particular mask design illustrated in FIG. 3 is not intended to be limiting upon the invention, but merely illustrative. It should be readily apparent to those skilled in the art that other types of varying transmissibility apertures may be used. For example, apertures 201 and 202 may be rectangular or circular in shape and be provided with material having a varying transmissibility characteristic.

Returning now to the circuit of FIG. 2, it will be assumed that the mask 200 is in the position illustrated in FIG. 3, whereby light from the lamp 102 impinges upon photoconductor 104, while photoconductor 106 is dark. When photoconductor 106 is dark it presents an extremely high resistance, preventing the firing of the Triac 3 during negative half cycles. That is, the resistance value of the photoconductor 106, when it receives no light, is so high that capacitor 108 cannot charge to the breakdown voltage of the Diac 6 over one negative half cycle. During the following positive half cycle, capacitor 108 discharges. Diode 105, in series with the photoconductor 104, prevents current flow through the photoconductor 104 during negative half cycles.

During positive half cycles current flow is from the terminal 1 through the resistor 101, photoconductor 104 and diode 105 to the capacitor 108. The charging rate of capacitor 108 is determined by the resistance value of photoconductor 104 which in turn depends upon the quantity of light received from the lamp 102. As previously explained this quantity of light is controlled by the aperture 202 in the mask 200. The greater the light intensity, the lower the resistance of the photoconductor 104 and thus, the greater the charging rate. When capacitor 108 charges rapidly, Diac 6 fires early in the positive half cycle and thus, a greater proportion of each positive half cycle is applied to the motor 15. As the amount of light to the photoconductor 104 decreases, thereby decreasing the charging rate of the capacitor 108, Diac 6 fires at a later point in time during each positive half cycle and thus, a smaller percentage of each positive half cycle flows through the motor 15 thereby decreasing the speed of the motor.

The photoelectric switch control circuit 115 is provided with resistor 109 shunting diode 105 and capacitor 108 and resistor 110 shunting diode 107 and resistor 108. The purpose of the resistors 109 and 110 will now be explained. Resistors 109 and 110 speed up the response time of the photoconductors. The introduction of, for example, resistor 109 decreases the voltage drop across capacitor 108, causing photocell 104 to have to see more light and lower its resistance to maintain the voltage across capacitor 108, the value of the resistor 109 being selected so that the photoconductor operates in the large slope regions of its characteristic curves, whereby more rapid response times are obtained. Resistors 109 and 110 also serve to insure complete discharge of capacitor 108 on non-conducting half cycles.

Resistor 111 and capacitor 112 provide an additional phase shift, that is a time delay, to extend the turn-on range of the circuit. It has particular application when it is desired to run the motor at a very slow speed. The provision of the delay network comprising resistor 111 and capacitor 112 permit the Diac 6 to breakdown and thus fire the Triac 3 at a later point in time of the selected half cycle than is possible with the provision of the capacitor 108 alone.

It should also be noted, that as the motor speeds up, its increasing back EMF subtracts more from the line voltage leaving less line voltage across the control circuit 115. This results in the following. Firstly, the current flow through the lamp 102 is reduced causing it to emit less light. Secondly, the voltage available to charge the capacitors 108 and 112 through the photocell 106 or 104 is reduced. Thirdly, the voltage available to drive current through the Triac 3, once it is turned on is reduced. These all result in a reduced drive to the motor. The first two cause capacitor 112 and capacitor 108 to take longer to charge to the threshold firing voltage of the Diac 6, reducing the duty cycle of the drive current to the motor. The third factor causes a smaller motor current flow when the Triac 3 is turned on. As a result, the motor speed is highly stable with respect to load. In particular, the motor will not run away when the load is suddenly removed. If a neon bulb is used as a light source 102 to activate the photoconductors, when the motor tries to go too fast, in extreme cases, the lamp would fail to fire at all which would cut off all current to the motor.

Returning now to FIG. 3, the motion of the control mask 200 can be manual or it can be part of a feedback servo-mechanism to regulate an item driven by the motor or it can be caused by any conceivable motion to which a reaction by motor 15 is desired. Further, the amount of light received by the photoconductors can be controlled by a flowing fluid or a change in opacity by chemical or other means without the physical motion of a mask.

Figure 5:
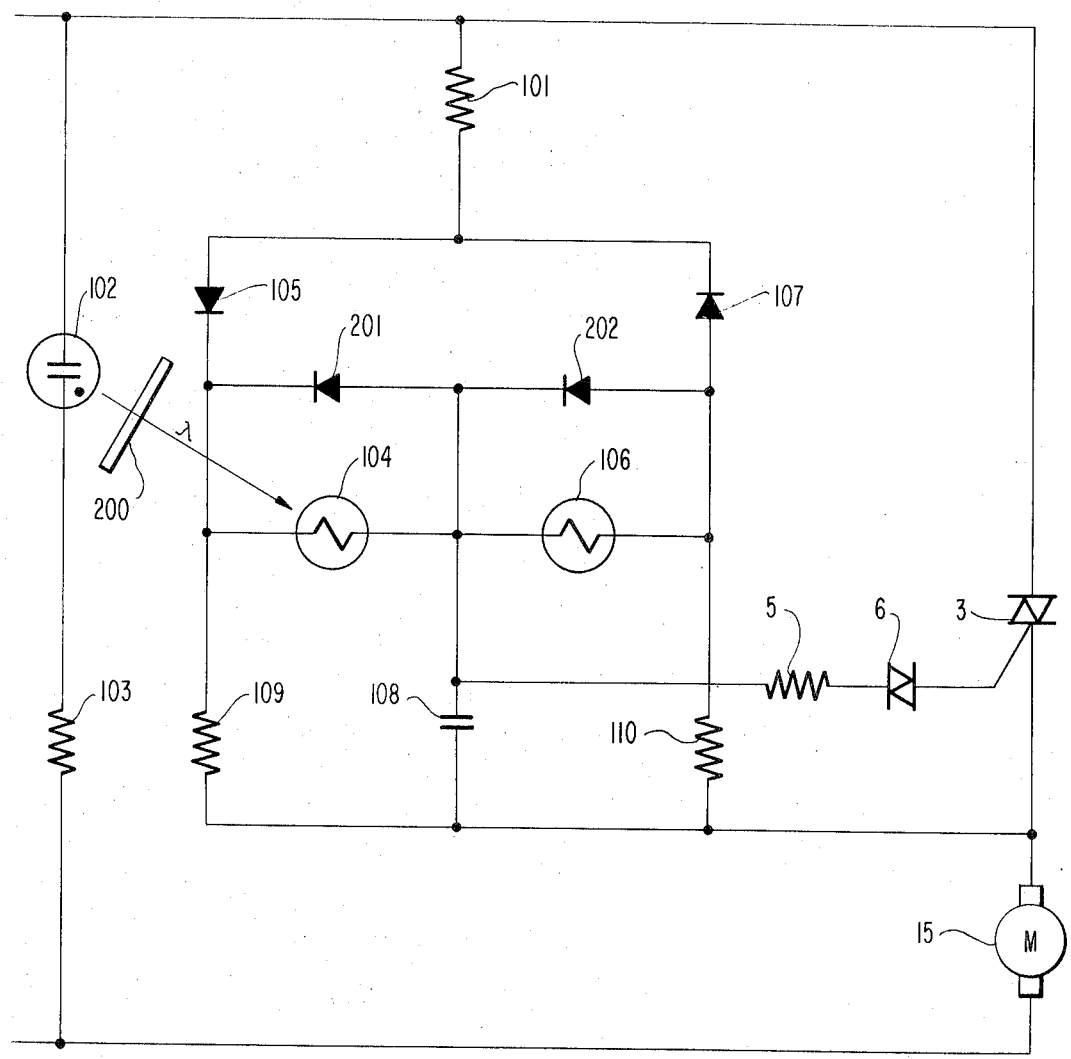
FIG. 5 is a schematic diagram of another embodiment of the control circuitry of the present invention with improved low speed control.

FIG. 5 shows another embodiment of the photoelectric speed and direction control circuit of the invention. Motor 15, Triac 3, Diac 6, Resistor 5, Capacitor 108, Resistor 101 all operate in the same manner as in the embodiment shown in FIG. 2. Cells 104 and 106 still provide charging current through diodes 105 or 107, and resistor 101 to capacitor 108 as before. Lamp 102 is connected by means of the resistor 103 across the line to reduce the limiting effect for greater top speed. Diode 201 conducts any residual charge left on capacitor 108 (of positive nature) through resistor 109, particularly during negative line cycles when diode 105 is non-conducting. In like manner, diode 202 conducts residual negative charge through resistor 110 during positive line cycles when diode 107 is non-conducting.

This embodiment permits speeds so slow as to cause the motor to "creep", thus extending the speed range. The addition of extra resistor 111 and capacitor 112 would cause further range extension as before.

Resistors 109 and 110 in this embodiment do not cause the cells to operate in their faster region. To cause that effect here would require an additional resistor across capacitor 108.

Figure 4:
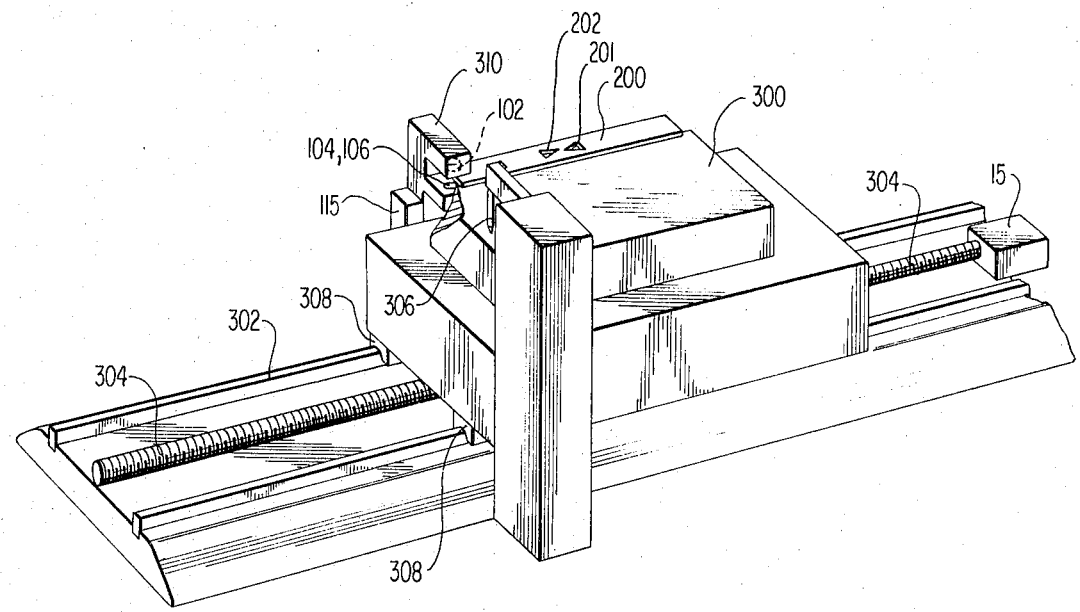
FIG. 4 illustrates the system of FIGS. 2 and 3 functioning as a semi-automatic work piece position control system.

In a further embodiment of the invention, as illustrated in FIG. 4, the mask 200 forms a portion of a workpiece position control system, which includes the motor 15 and the photoelectric switch control circuit 115. Workpiece holder 300 moves along rails 302 by the operation of screw gear 304 powered by motor 15. The motor control apparatus functions to properly position the workpiece holder 300 before a press 306 or other machine. The press may, for example, be a drill press, stamp press, etc. Mask 200 may be attached to the edge of the holder 300, so as to pass between lamp 102 and photocells 104 and 106 mounted on a suitable support 310. As the holder 300 arrives in the vicinity of the press 306, the operator applies AC power to the circuit 115, which operates in the manner previously disclosed to center workpiece mounted on holder 300 with respect to the press 306. Such a system can be used in a machine process wherein an article to be machined must be retained at a center position. In this case, the article to be machined may be supplied with the mask removably attached thereto.

In a further embodiment of the present invention the mask or plurality of masks can be coupled to a hand operated lever with the motor coupled to the drive train of an electric vehicle, to thereby develop a speed and direction control system for propelling such an electric vehicle.

While the invention has been particularly shown and described with reference to a preferred embodiment thereof, it will be understood by those skilled in the art that various changes in form and details may be made therein without departing from the spirit and scope of the invention.

What is claimed is:

1. A speed and direction control circuit for a DC motor comprising:
   triggerable bi-directional current conducting means connected in series with said DC motor and an AC power source,
   bi-directional breakdown means connected to trigger said triggerable bi-directional current conducting means when the breakdown voltage of said breakdown means is exceeded, RC timing circuit means connected to the AC power source and to said bi-directional breakdown means for controlling which half cycle and the time during that half cycle of the AC power source when said bi-directional current conducting means is triggered, said RC timing circuit means including a capacitor connected to discharge through said bi-directional breakdown means when the voltage across said capacitor exceeds said breakdown voltage, first series-connected photocell and diode circuit means and second series-connected photocell and diode circuit means, said first and second series-connected photocell and diode circuit means being connected in parallel to control the direction and rate of charging of said capacitor, the diodes in said first and second series-connected photocell and diode circuits means being oppositely poled with respect to one another, lamp means, and movable mask means interposed between said lamp means and the photocells in said first and second series-connected photocell and diode circuits means, said mask means having first and second varying transmissibility aperture means disposed with respect to one another along the direction of movement of said movable mask means each of said aperture means controlling the illumination of one of said photocells by said lamp means as a function of the movement of said mask means.

2. The control circuit of claim 1, wherein said varying transmissibility apertures comprise shaped apertures positioned on said mask with respect to the position of said photocells and lamp means such that when light from said lamp means passes through one of said apertures to one of said photocells, substantially no light impinges on the other photocell.

3. The control circuit of claim 2 wherein the shaped apertures are triangular with their apices pointed in opposite directions along the direction of movement of said movable mask means.

4. The control circuit of claim 1 further comprising a resistor connected between said first capacitor and said bi-directional breakdown means and a second capacitor connected to the junction of said resistor and said bi-directional breakdown means and in parallel with said first capacitor, said resistor and said second capacitor serving to provide a time delay thereby extending the turn-on range of said circuit for applications where very slow running speeds of said motor are desired.

5. The control circuit of claim 1 further comprising third and fourth diodes respectively connected in shunt with the photocells in said first and second series-connected photocell and diode circuits means, said third and fourth diodes being oppositely poled to the diodes in their respective circuits and serving to provide conduction paths for any residual charge on said capacitor when the diodes in their respective circuits are non-conducting whereby very slow speeds of said motor are permitted thereby greatly extending the speed range.

6. The control circuit of claim 1 wherein said first and second series-connected photocell and diode circuit means are in turn connected in series with said capacitor and the source of AC power.

7. The control circuit of claim 6 further comprising a first resistor connected in shunt with the diode in said first series-connected photocell and diode circuit means and said capacitor, and a second resistor connected in shunt with the diode in said second series-connected photocell and diode circuit means and said capacitor, said first and second resistors having values selected so that the photocells operate in the large slope regions of their characteristic curves whereby more rapid response times are obtained.

* * * * *